United States Patent [19]

Koizumi et al.

[11] 3,950,784
[45] Apr. 13, 1976

[54] APPARATUS FOR AUTOMATICALLY ADJUSTING THE PLAYBACK POSITION OF MAGNETIC DATA RECORDING DEVICE

[75] Inventors: Masayoshi Koizumi, Urawa; Satoshi Tamura, Tokyo, both of Japan

[73] Assignees: Nippon Data Recorder Co., Ltd.; Nippon Pulsmotor Co., Ltd., both of Tokyo, Japan

[22] Filed: Aug. 6, 1974

[21] Appl. No.: 495,114

[30] Foreign Application Priority Data

Aug. 6, 1973 Japan.................................. 48-88661

[52] U.S. Cl. ........................ 360/84; 360/74; 360/96
[51] Int. Cl.² G11B 21/12; G11B 19/26; G11B 15/48
[58] Field of Search ............ 360/84, 74, 96, 101, 71, 360/107, 109; 74/750 R

[56] References Cited
UNITED STATES PATENTS

| | | | |
|---|---|---|---|
| 2,613,938 | 10/1952 | Bossmeyer............................ | 360/74 |
| 3,019,301 | 1/1962 | Aalund et al. ......................... | 360/84 |

*Primary Examiner*—Alfred H. Eddleman
*Attorney, Agent, or Firm*—Whittemore, Hulbert & Belknap

[57] ABSTRACT

An apparatus for automatically adjusting the playback position of the magnetic data recording device of the kind in which a rotating magnetic head is contacted with a stationary recording tape for recording the data on the tape and the tape is then advanced a predetermined length for recording the next data on the recording tape. The apparatus is designed to prevent the non-registration between the playback head position and the recorded zones of the tape and, to this end, a differential gearing is provided between the capstan shaft adapted for reeling out or unwinding of the tape and the driving shaft for said capstan shaft and operated to compensate for any non-registration between the playback head position and the recorded zones of the tape and automatically bringing the playback head at the edge of the recorded zone in the tape in good timing with the feed of the tape.

1 Claim, 5 Drawing Figures

APPARATUS FOR AUTOMATICALLY ADJUSTING THE PLAYBACK POSITION OF MAGNETIC DATA RECORDING DEVICE

BACKGROUND OF THE INVENTION

The present invention relates to an apparatus mounted to an incremental type magnetic data recording device and adapted for automatically adjusting the playback head position relative to the recorded zones of the tape at the time of playback.

In the conventional casette type data recording device, the magnetic tape is advanced in either directions before the stationary magnetic head for recording or reproducing the data by the magnetic recording or playback head. With the device of such type, the magnetic tape is liable to be damaged by the dust and dirt collected on the magnetic head, and the recording quality is lowered. In order to obviate such defect, a data recording device is also known in which the rotary head is contacted with the stationary tape for recording and playback. The latter device has however such a defect that nonregistration may be caused between the playback head position and the recorded zones on the tape when the data recorded on the tape are reproduced, and a correct timing is not obtained at the start of the playback operation.

In view of the foregoing, the present invention has it for its object to provide an automatic adjustment device for adjusting the position of the playback head for performing the playback in good timing with the feed of the recorded magnetic tape.

BRIEF DESCRIPTION OF DRAWINGS

The present invention will now be explained in more detail by referring to the accompanying drawings in which a preferred embodiment of the adjustment apparatus as applied to the incremental mode data recording device is illustrated, and in which.

In the drawings.

DETAILED DESCRIPTION OF THE INVENTION

First of all, the incremental mode magnetic data recording device will be explained briefly as a typical device to which the device of the present invention is applied.

Figure 1:
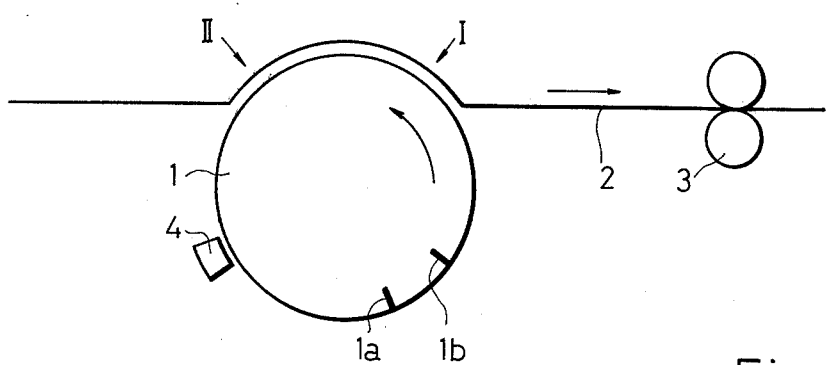
FIG. 1 is an explanatory view showing schematically the magnetic data recording device of the incremental mode.

In FIG. 1, a recording head 1a and a playback head 1b are mounted on the circumference of a circular head 1 driven in rotation by an electric motor, not shown, for recording the data on a magnetic tape 2 which is kept in a fixed position and for reproducing the data for check as the latter are recorded. The circular head 1 is rotated in the direction of the arrow mark as a start signal is supplied to the head 1. Recording is started when the recording head 1a comes to the position indicated at I in the drawing and is contacted with the magnetic tape 2, and terminated as the head 1a comes to the position II and is about to leave the tape 2.

The playback head 1b is arranged backwardly of the recording head 1a on the circumference of the circular head 1 and adapted to travel along recorded portion of the tape 2 for reproducing and checking the recorded data on the tape after the recording head 1a has come to the above-mentioned position II. During this time, the tape 2 is kept stationary. As the playback head 1b has passed through the position II, the tape 2 is fed by a predetermined length by means of the capstan 3 and the driving mechanism associated therewith. A complete cycle of recording and check playback operation comes to the close, and the capstan 3 is now stopped along with the tape. The numeral 4 designates the head cleaner for cleaning the surface of the heads 1a, 1b.

Figure 2:
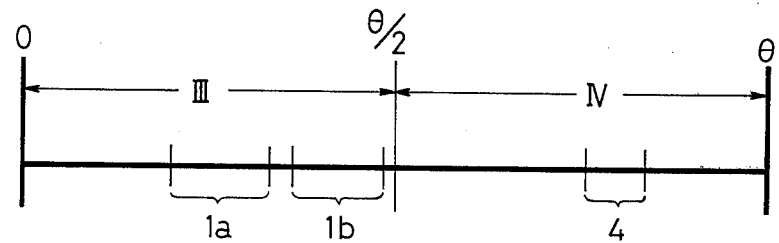
FIG. 2 is a diagram showing the operational cycle of the recording device.

The complete cycle of operation for the circular head 1 is shown diagrammatically in FIG. 2, in which III designates the period in which the tape 2 is stopped and the head 1 is rotated by an angle of $\theta/2$ (90° or 180° for instance) and IV designates the period in which the tape 2 is fed by the capstan. The numerals 1a, 1b and 4 in this FIG. 2 represent the contact zones of the heads and the cleaner with the tape, respectively.

Figure 3:
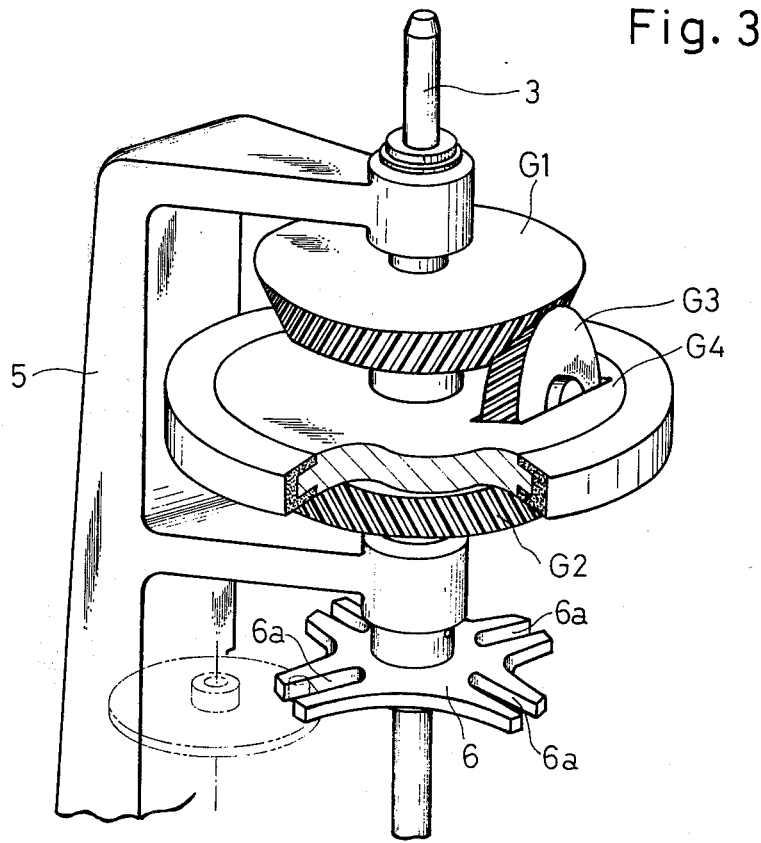
FIG. 3 is an explanatory perspective view of the present apparatus.
Figure 4:
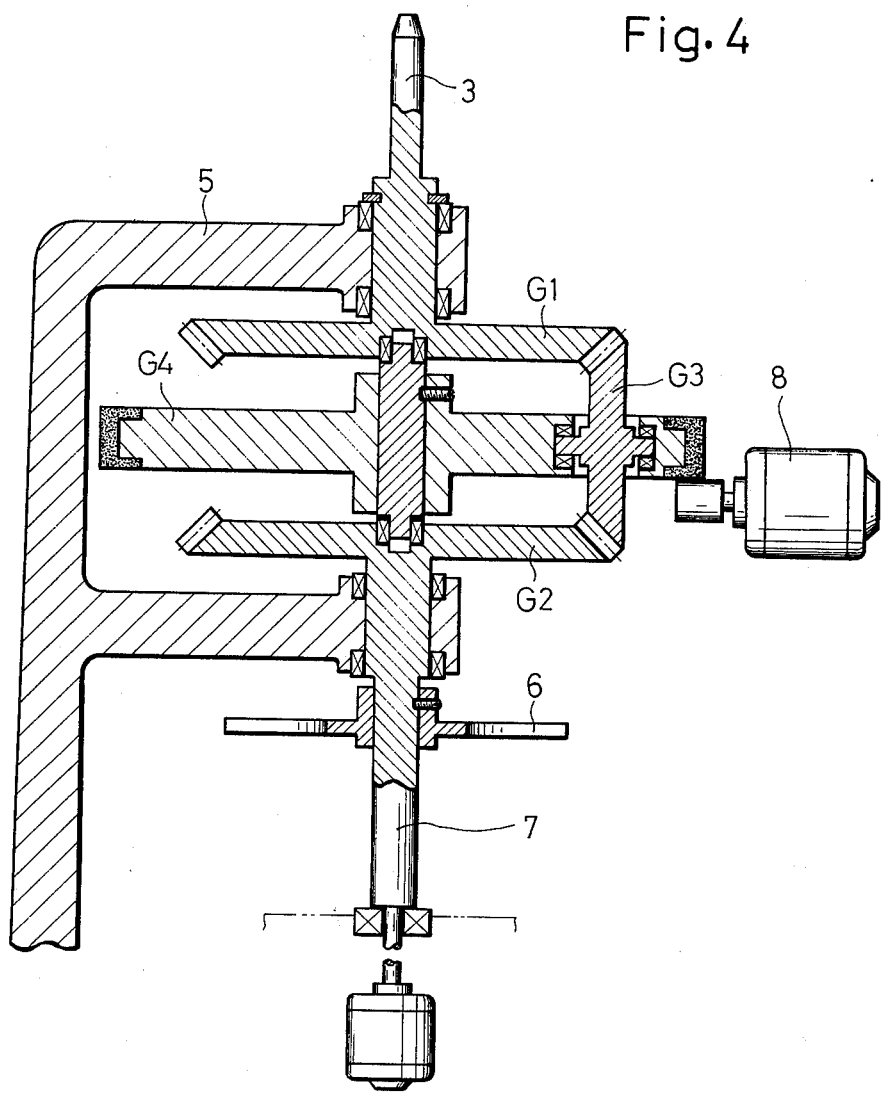
FIG. 4 is an elevational view in section of the present apparatus.

FIGS. 3 and 4 show the apparatus of the present invention as mounted to the data recording device. In these Figures the numeral 3 designates the capstan already explained with reference to FIG. 2. The capstan 3 is journaled rotatably by a support frame 5 provided to some suitable place in the device, and a first bevel gear $G_1$ is integrally fitted to the lower end of the capstan 3. The numeral 6 designates a Maltese wheel which is also rotatably journaled by the support frame 5 coaxially with the capstan 3. Maltese wheel 6 is provided with a groove 6a in each of the four arms thereof for engagement with a cam shown by the double chain-dotted line and adapted to be driven intermittently and periodically into rotation by drive means, not shown. The tape movement shown at IV in FIG. 2 is effected by the intermittent rotation of the Maltese wheel 6 which is transmitted throught the capstan 3 to the tape 2.

In more detail, the Maltese wheel 6 is fixed to an arbor 7 to which a second bevel gear $G_2$ is secured. This second bevel $G_2$ is linked with said first bevel gear $G_1$ by a planetary bevel gear $G_3$ kept in meshing with both of the first and second bevel gear and adapted to travel along the permiter of the gears $G_1$, $G_2$. The capstan 3 thus makes a revoltion about its axis and in a reverse direction to that of the Maltese wheel 6.

$G_4$ designates a counter driving gear arranged coaxially with said first and second bevel gears $G_1$, $G_2$. More in detail, this counter driving gear $G_4$ is carried loosely by shafts of the gears $G_1$, $G_2$ and adapted to be rotated by a driving electric motor 8 irrespective of the rotation of these bevel gears. Said planetary bevel gear $G_3$ is carried rotatably in the upright position by said counter gear $G_4$ so that, with rotation of said counter driving gear $G_4$, said planetary gear $G_3$ meshes with both the first and second bevel gears and travels along the perimeter of said bevel gears $G_1$, $G_2$, as it is rotated about its own axis.

Figure 5:
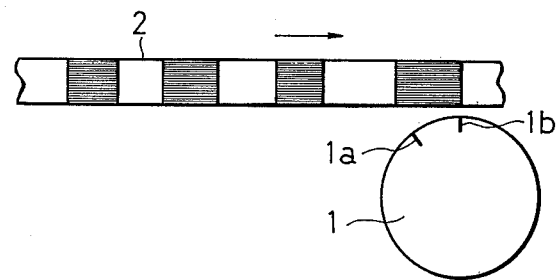
FIG. 5 is an explanatory view showing the mode of operation of the present apparatus.

The apparatus of the present invention operates as follows:

When reproducing the data recorded periodically and intermittently on the tape 2 as indicated by shaded portions thereof shown in FIG. 5, with the playback head 1b brought into contact with the tape 2, the intermittent rotation of the Maltese wheel 6 is transmitted to the capstan 3 through bevel gears $G_1$, $G_2$ and the planetary bevel gear $G_3$, thereby the tape 2 being fed so that the recorded portions thereof come into correct registration with the position of the playback head 1b. Should the ends of the recorded zones in the tape 2 deviate to the left or right of the playback head 1b, such deviation is sensed by a sensor, not shown, and an electrical signal corresponding to such deviation is transmitted to the electric motor 8.

As the motor 8 is set in rotation, the counter driving wheel $G_4$ starts to rotate, and the rotation of the bevel gears $G_1$, $G_2$ is accelerated or decelerated by the medium of the planetary bevel gear $G_3$ in amounts corresponding to the deviation to the left or right from the registration position between the playback head 1b and the recorded zone in the tape 2. Thus, the rotation of the capstan 3 is accelerated or decelerated, and the playback head 1b of the circular head 1 is brought into an accurate registration position relative to the recorded zone in the tape 2 and in good timing with the feed of the tape.

In an modified embodiment of the invention, not shown, the Maltese wheel of the above-mentioned incremental mode recording device may be kept out of use and stationary and the counter driving wheel $G_4$ is driven in rotation permanently for continuous rotation of the capstan 3. In this modified embodiment, the recording device is used as a fixed head type one in which the head is fixed and the tape 2 is fed continuously.

It will be seen from above that the tape can be kept stationary and the magnetic head driven into rotation for recording and playback, or the tape is fed continuously for playback with the magnetic head being fixed, and that such reversal of the operation of the tape and the magnetic heads does not give rise to any undue froce being applied to the mechanism of the data recording device.

It will also be apparent that the problem involved in the non-registration of the playback head position and the recorded zone in the tape is solved satisfactorily in accordance with the apparatus of the present invention.

What is claimed is:

1. An apparatus for automatically adjusting the playback position in a magnetic data recording device having a capstan shaft with a capstan thereon comprising a first bevel gear fitted to the capstan shaft of the recording device, a Maltese cross wheel shaft coaxial with said capstan shaft, a second bevel gear fitted to the Maltese cross wheel shaft, a planetary bevel gear meshing with said second bevel gear for transmitting Maltese cross wheel rotation to the capstan shaft, and a counter driving wheel arranged intermediate said first and second bevel gears and carrying said planetary bevel gear so that the latter meshes with and travels along the peripheral teeth of said first and second bevel gears, said counter driving wheel, when rotating, operating to accelerate or decelerate the rotation of said capstan shaft of the recording device.

* * * * *